US012135168B2

(12) United States Patent
Duhe

(10) Patent No.: US 12,135,168 B2
(45) Date of Patent: Nov. 5, 2024

(54) DENSIFICATION METHOD AND APPARATUS

(71) Applicant: HarbisonWalker International Holdings, Inc., Moon Township, PA (US)

(72) Inventor: Kim M. Duhe, Katy, TX (US)

(73) Assignee: HarbisonWalker International Holdings, Inc., Moon Township (PA)

( * ) Notice: Subject to any disclaimer, the term of this patent is extended or adjusted under 35 U.S.C. 154(b) by 146 days.

(21) Appl. No.: 17/867,902

(22) Filed: Jul. 19, 2022

(65) Prior Publication Data

US 2023/0024399 A1 Jan. 26, 2023

Related U.S. Application Data

(60) Provisional application No. 63/223,328, filed on Jul. 19, 2021.

(51) Int. Cl.
*F27D 1/16* (2006.01)
*F27D 1/00* (2006.01)

(52) U.S. Cl.
CPC .... *F27D 1/1626* (2013.01); *F27D 2001/0046* (2013.01); *F27D 2001/0079* (2013.01); *F27D 2001/1615* (2013.01)

(58) Field of Classification Search
CPC ........... F27D 1/1626; F27D 2001/0046; F27D 2001/0079; F27D 2001/1615; F27D 3/1518

(Continued)

(56) References Cited

U.S. PATENT DOCUMENTS 3,563,523 A * 2/1971 Wendt, Jr. ................ C21B 7/06 222/196
8,216,954 B2 * 7/2012 Mori ...................... A61P 25/28

(Continued)

FOREIGN PATENT DOCUMENTS

CN 107858480 A 3/2018
JP H06-145737 A 5/1994

(Continued)

OTHER PUBLICATIONS

Sutherland, J. J. et al. (2019). Managing the tap-hole life-cycle at five submerged arc furnaces producing silicomanganese at Transalloys. *Journal of the Southern African Institute of Mining and Metallurgy*, 119(6), 563-571.

(Continued)

*Primary Examiner* — Jessee R Roe
*Assistant Examiner* — Michael Aboagye
(74) *Attorney, Agent, or Firm* — KUSNER & JAFFE

(57) ABSTRACT

A method of densification of refractory material in a gap between a tap hole sleeve of a furnace and a surround block of the furnace, the surround block surrounding the tap hole sleeve, the method comprising, includes positioning a tool in the gap, the tool including a support having opposing surfaces and a sidewall connecting the opposing surfaces, the opposing surfaces having an arcuate shape, a plurality of elongated members extending from one of the opposing surfaces, and a connector arranged on the other of the opposing surfaces. The gap is filled with dry material, and vibration is applied to the tool to densify the dry material.

27 Claims, 5 Drawing Sheets

(58) Field of Classification Search
USPC .................................. 266/45, 271, 272, 273
See application file for complete search history.

(56) References Cited

U.S. PATENT DOCUMENTS

| | | | | | |
|---|---|---|---|---|---|
| 10,281,213 | B2 * | 5/2019 | Clesen | .................. | F27D 3/1527 |
| 10,400,294 | B2 * | 9/2019 | Cartmill | ................ | F27D 3/1536 |

FOREIGN PATENT DOCUMENTS

| | | | | | |
|---|---|---|---|---|---|
| JP | 2004-263261 | A | 9/2004 | | |
| KR | 10-0832528 | B1 | 5/2008 | | |
| KR | 100832528 | * | 5/2008 | ............. | C21C 5/445 |

OTHER PUBLICATIONS

Nelson, L. R. et al. (May 2016). The tap-hole-key to furnace performance. *Journal of the Southern African Institute of Mining and Metallurgy*, 116(5), 465-490.

* cited by examiner

DENSIFICATION METHOD AND APPARATUS

RELATED APPLICATIONS

This application claims the benefit of U.S. Provisional Application No. 63/223,328 filed Jul. 19, 2021, which is hereby fully incorporated herein by reference.

FIELD OF THE INVENTION

The present invention relates generally to tap holes of a metal furnace, and more particularly, to an apparatus and method for densification of a region around the tap hole.

BACKGROUND OF THE INVENTION

Eccentric bottom tap electric arc furnaces (EBT EAF) are equipped with an exit mechanism, which allows for safe discharge of liquid steel from the furnace at the end of the melting cycle. This mechanism is referenced by those skilled in the art as "tap hole". A typical EBT EAF 10 and tap hole 12 are shown in FIG. 1.

The bottom of the EAF 10 is normally constructed using a dry basic monolithic material composed from magnesia, dolomitic magnesia, dolomitic materials, or a combination of these materials. Because these materials are unshaped and in bulk consistency, they are densified during installation of the bottom portion of the EAF 10 with special densification tools. These tools use compression or vibration during the densification process, and are well suited for the densification of the EAF bottoms.

When repairing the EAF 10, entry into to EAF by the installation operators is only possible after the EAF 10 is cooled down. This is not the optimum scenario from the EAF equipment utilization rate perspective, as such cool down requires time, sometimes more than 8 hours and up to 24 hours. During the cool down period the EAF cannot be used for the melting and production of steel.

Some densification tools have been adjusted for use in a hot furnace. In that case the tools are placed into the EAF 10 by a crane and do not require entry by the operator. This procedure requires that the roof of the EAF 10 be moved into an open position so the crane has an open path to place the tool in the EAF and perform the densification process. This hot repair method improves the EAF utilization rate.

Conventional densification of the dry monolithic material in the tap hole region is done with the use of lance pipe (e.g., an elongated rod or pipe that is inserted into the monolithic material). This tool is hand operated by the repair/installation personnel. The repair is typically done thru a sump panel sanding hole and exposes the operator to a hot and unsafe environment. Further, the process is very inefficient and time-consuming and extremely dependent on the skill and performance of the installation operator. Due to the differences in skill and the difficult work environment, using a lance pipe to aerate and pack the material in the tap hole region may not achieve the required densification. Poor densification of the dry material in the tap hole 12 and surrounding region results also in low support of the tap hole components and leads to sub-standard performance of the tap hole assembly, which in turn leads to more frequent maintenance of the tap hole 12. This not only increases the EAF operation cost associated with the use of more tap hole components, but also causes more frequent repairs, thereby decreasing the utilization rate of the equipment.

SUMMARY OF THE INVENTION

Aspects of the invention are directed to a tool for densification of dry refractory material in and around the tap hole by aerating the material through vibration as the material is being installed. The shape of the tool allows it to come in through a sump panel tap-hole sanding hole and fit between the tap hole and surround block to vibrate the material as it is being installed.

A tool according to aspects of the invention has a plate-like structure that is shaped to fit within a gap between internal and external components of the tap hole, e.g., the plate-like structure has an arc shape that corresponds to a gap defined by the tap hole and the surround block. The plate-like structure includes a plurality of elongated members, e.g., rods, fixed thereto, the rods having a predetermined length and extending outward in a direction perpendicular to a major surface of the plate-like structure. The rods may be fixed to the plate via bolts, threads and/or welds. On a side opposite from that in which the rods extend, the plate-like structure includes a mounting means for attachment to a vibration machine. The mounting means may be a sleeve with and/or compression device or other fixing means to fix the plate-like structure to an actuator coupled to the vibration machine.

An advantage of the device and method in accordance with the invention is that it can be used to increase the density of the dry material around the tap hole during installation, thereby increasing performance of the tap hole. Additionally, operating cost and down-time of the EAF equipment due to replacement of internal sleeves is decreased.

According to one aspect of the invention, a method is provided for densification of refractory material in a gap between a tap hole sleeve of a furnace and a surround block of the furnace, the surround block surrounding the tap hole sleeve. The method includes: positioning a tool in the gap, the tool including a support having opposing surfaces and a sidewall connecting the opposing surfaces, the opposing surfaces having an arcuate shape, a plurality of elongated members extending from one of the opposing surfaces, and a connector arranged on the other of the opposing surfaces; filing the gap with dry material; and applying vibration to the tool to densify the dry material.

In one embodiment, filling the gap with dry material includes using at least one of magnesia, dolomitic magnesia or dolomitic material as the dry material.

In one embodiment, applying vibration includes attaching a vibration machine to the connector, wherein the vibration machine applies a vibrating motion to the tool.

In one embodiment, positioning the tool includes maneuvering the tool through a sump panel sanding hole of the furnace.

In one embodiment, applying vibration includes using at least one of a mechanically-powered vibration device, a pneumatically-powered vibration device or an electrically-powered vibration device to apply the vibration to the tool.

In one embodiment, filing the gap with dry material includes filing the gap in layers having a prescribed thickness.

In one embodiment, the prescribed thickness is less than a length of elongated members.

In one embodiment, the steps of filing the gap and applying vibration are performed simultaneously.

In one embodiment, the steps of filing the gap and applying vibration are performed sequentially.

According to another aspect of the invention, a tool for densification of refractory material in a tap-hole of a furnace, the tool comprising: a support having opposing surfaces and a sidewall connecting the opposing surfaces, the opposing surfaces having an arcuate shape;

a plurality of elongated members extending from one of the opposing surfaces; and a connector arranged on the other of the opposing surfaces, the connector comprising a fastener configured to selectively and fixedly couple the connector to a vibrating member.

In one embodiment, at least some of the plurality of elongated members include a channel formed within the respective elongated member, the channel opening at an end of the respective elongated member distal from the support.

In one embodiment, at least some of the plurality of elongated members comprise a pipe.

In one embodiment, the arcuate shape is dimensioned to correspond to the tap hole of the furnace.

In one embodiment, the plurality of elongated members extend in a direction perpendicular to a major face of the opposing surfaces.

In one embodiment, the support comprises a metal plate.

In one embodiment, an end of at least some of the plurality of elongated members that is distal from the support is tapered.

In one embodiment, at least some of the plurality of elongated members are welded to the support.

In one embodiment, at least some of the plurality of elongated members are threadedly attached to the support.

In one embodiment, an end of at least some of the plurality of elongated members extends through the support, a first fastener is threadedly coupled to the respective elongated member and arranged on one of the opposing surfaces, and a second fastener is threadedly coupled to the respective elongated member and arranged on the other of the opposing surfaces.

In one embodiment, an outer radius of the opposing surfaces is between 14-16 inches, and an inner radius of the opposing surfaces is between 10-12 inches.

In one embodiment, the connector comprises a sleeve configured to receive to a vibrating member.

In one embodiment, the fastener comprises one of a clamp or a bolt.

In one embodiment, the tool includes a vibration device coupled to the connector.

In one embodiment, the opposing surfaces are planar surfaces that are substantially parallel to each other.

In one embodiment, the support has a length defined along a major axis of the support, and a width defined along a minor axis of the support, and a height defined between the opposing surfaces, the length being greater than the width, and the width being greater than the height.

In one embodiment, the fastener comprises a through hole formed in a portion of the connector.

In one embodiment, the fastener further comprises one of a threaded bolt configured for insertion into the through hole and a nut threadedly engagable with the bolt, or a pin configured for insertion into the through hole and a clip attachable to the pin.

According to another aspect of the invention, a system for densification of refractory material in a tap hole includes the tool as described herein, and a vibration device coupled to the tool.

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well-known process operations have not been described in details so as to not unnecessarily obscure the present invention.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

As used herein, the term "refractory material" refers to inorganic nonmetal materials utilized in various high-temperature equipment, e.g., steel production and the like. Refractory materials are characterized by a high melting point, and when exposed to high temperatures they do not lose their strength and of form.

Figure 1:
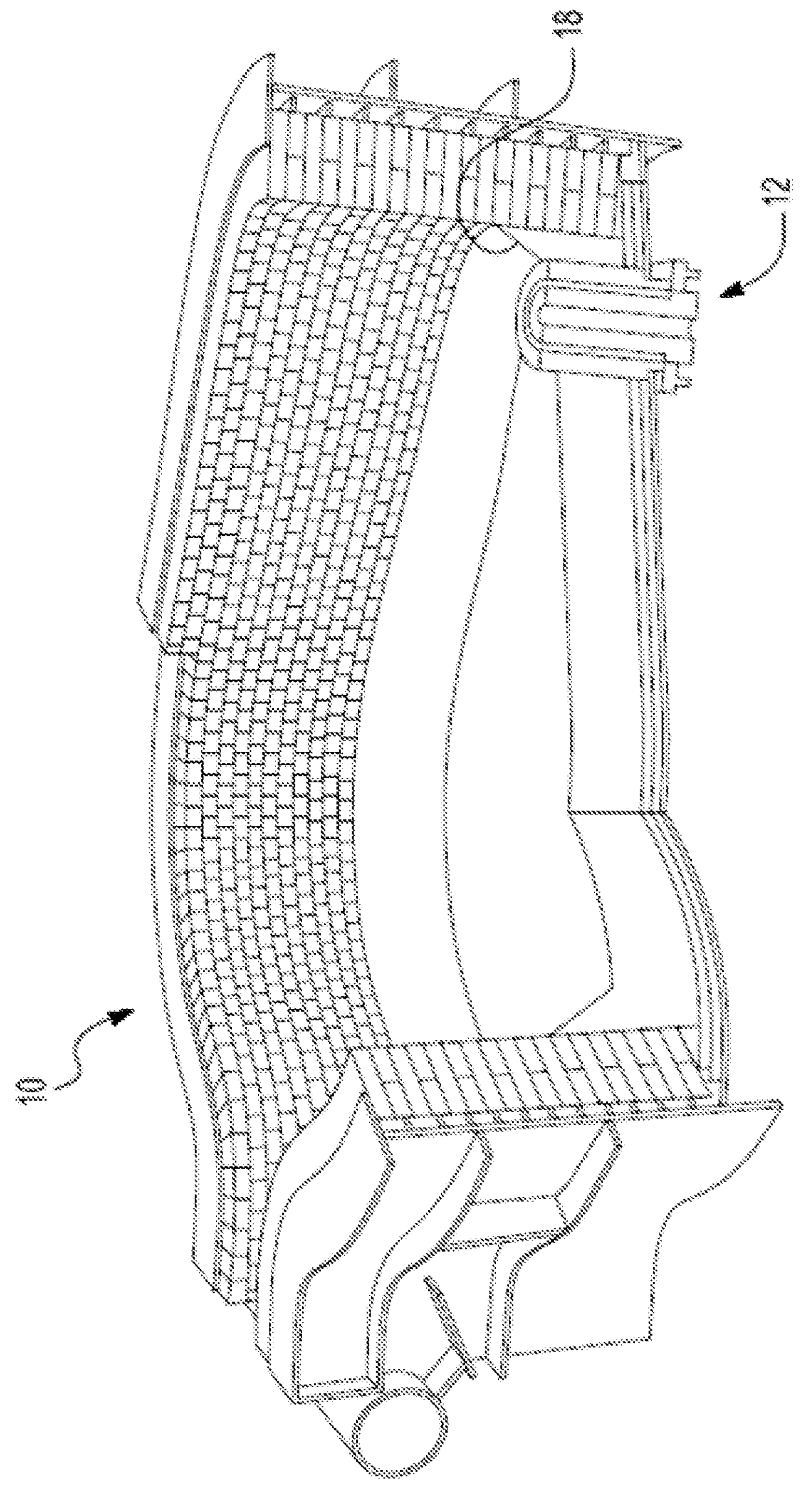
FIG. 1 is a perspective view of an eccentric bottom tap electric arc furnace having a tap hole.
Figure 2A:
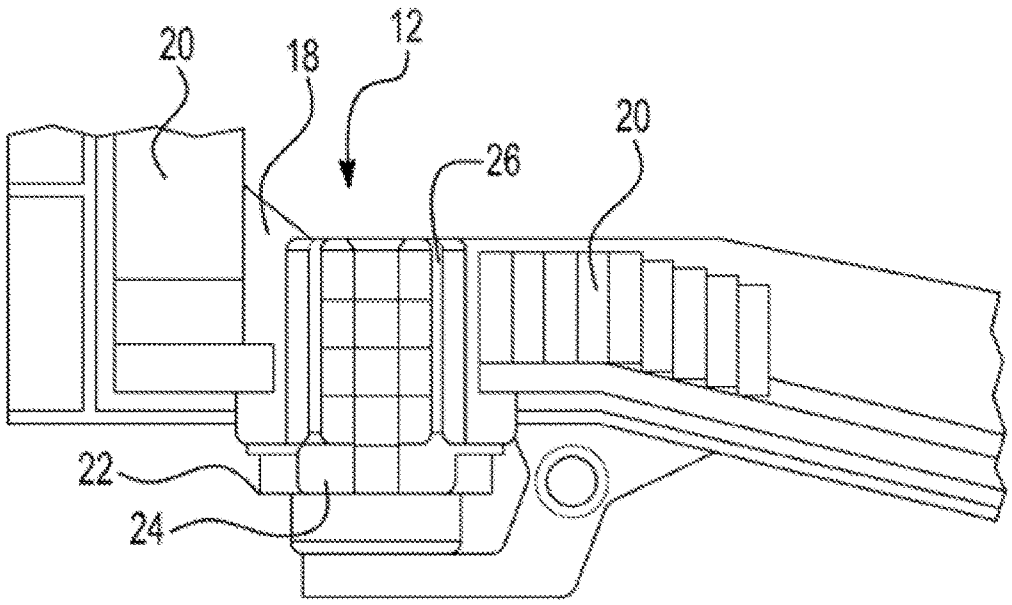
FIGS. 2A and 2B are cutaway views of the tap hole area of the furnace that may be used in the furnace of FIG. 1, the tap hole area shown in 2A has the tap hole sleeve, or replacement sleeve, in a fully installed position and in 2B has the tap hole sleeve, or replacement sleeve, in fully removed position.
Figure 2B:
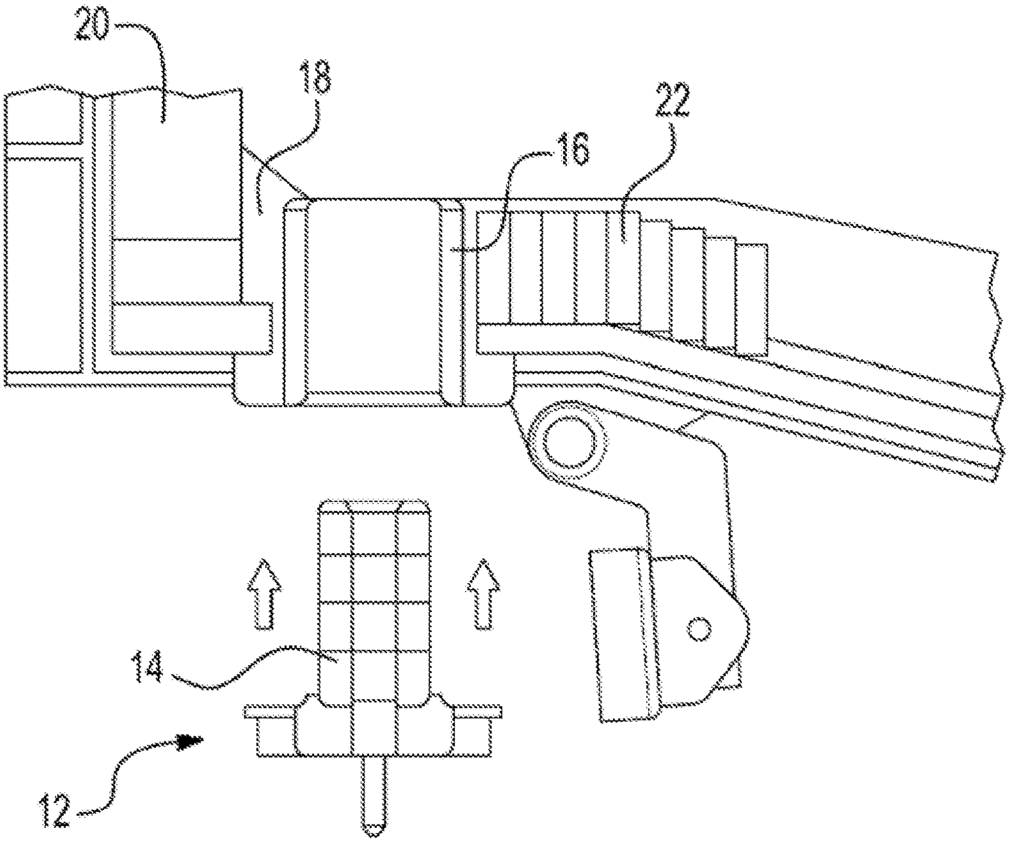

An exemplary tap hole area 12 is shown in FIGS. 2A (in installed position) and 2B (in removed position), the tap hole 12 including several key components. Internally, there is a tap hole sleeve, or replacement sleeve 14, which may be formed from one piece, or series of segments. Externally, a surround block 16 supports the internally-arranged tap hole sleeve, or replacement sleeve 14. A dry monolithic material 18, which is arranged between the wall of the EAF 10 (see FIG. 1) and surround block 16, and magnesia bricks 20, which are arranged on a floor and walls of the EAF 10, surround the tap hole 12. An optional water-cooled ring 22 may be arranged around an end block 24 of the tap hole sleeve, or replacement sleeve 14 to provide cooling of the tap hole end block.

Formed between the internally-arranged tap hole sleeve 14 and the external surround block 16 is a gap 26 designed to be between about 2½ to 4 inches wide. The gap 26 is filled with the same, or similar, dry monolithic material used for the construction of the EAF bottom. Because the gap 26 is very narrow, existing tools for EAF repair are not used for the new installation of tap hole sleeve 14 or hot repair of the tap hole replacement sleeve 14.

A tool in accordance with the invention can be used to achieve a required density of dry refractory material in the gap 26 of the tap hole 12. In this regard, the required density is achieved by aerating the material through vibration of the tool as the dry material is installed into the gap 26 of the tap hole 12. The shape of the tool allows it to come in through the sump panel sanding hole and fit between the surround block 16 and the tap hole sleeve 14 to vibrate the dry material in the gap 26 as the dry material is being installed. The densification tool is positioned within the gap 26 between the internal tap hole sleeve 14 (also referred to simply as the "tap hole") and the external surround block 16 (also referred to simply as the "surround block"), and the dry material (e.g., Americlase) is poured in to fill the gap 26 between the internally-arranged tap hole sleeve 14 and the surround block 16. A vibrating device attached to the tool aerates the dry material, thereby increasing the packing (density) of the dry material.

As will be discussed in further detail below, a head of the tool is complemented with a series of elongated members, e.g., pipes, dimensioned to allow easy placement within the gap 26. The tool includes a connection member for connection to the vibrating source, thereby enabling densification of the dry material by vibration force.

Figure 3A:
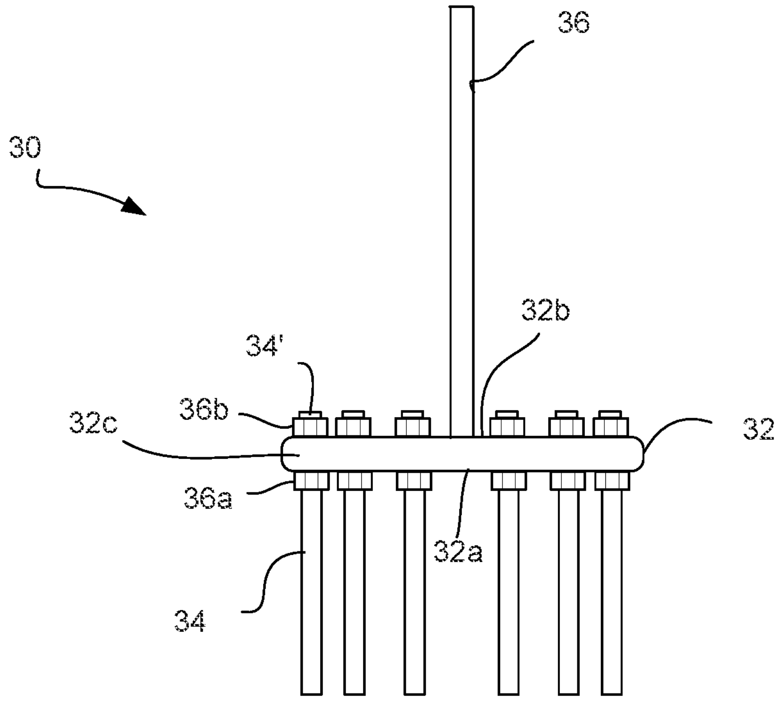
FIG. 3A is a side view of an exemplary tool in accordance with an embodiment of the invention.
Figure 3B:
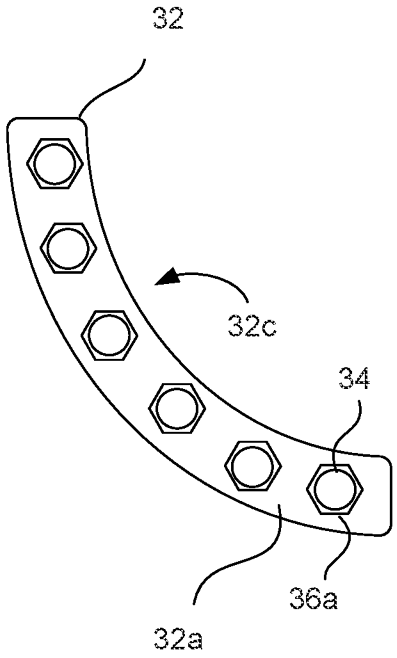
FIG. 3B is a bottom view of the tool of FIG. 3A.
Figure 3C:
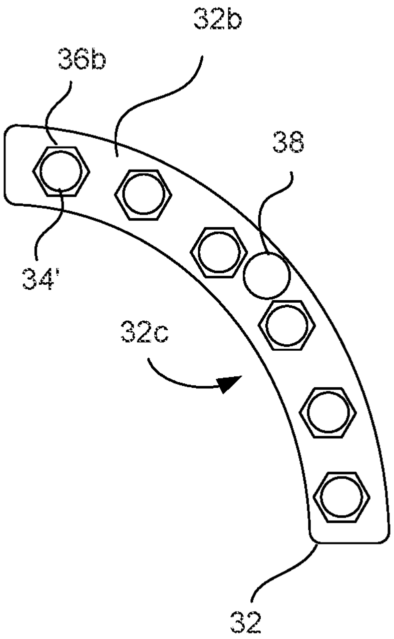
FIG. 3C is a top view of the tool of FIG. 3A.

Referring to FIGS. 3A-3C, illustrated is an exemplary tool 30 for densification of refractory material in a tap-hole 12 of an EAF 10 in accordance with an embodiment of the invention. FIG. 3A illustrates a side profile of the tool 30, FIG. 3B is a bottom view of the tool 30, and FIG. 3C is a top view of the tool 30. The tool 30 includes a support 32 having opposing surfaces 32*a*, 32*b* and a sidewall 32*c* connecting the opposing surfaces. The support 32 can be formed from metal plate, such as a steel plate, aluminum plate, or other cast/forged metal/metallic materials. As best seen in FIGS. 3B and 3C, the opposing surfaces 32*a*, 32*b* have an arcuate shape that is dimensioned to correspond to the tap hole of the furnace. For example, an outer radius of the opposing surface's arcuate shape may be between about 14-16 inches, and an inner radius of the opposing surfaces arcuate shape may be between about 10-12 inches.

The tool 30 further includes a plurality of elongated members 34 extending from surface 32*a*, and a connector 36 extending from the surface 32*b*. As can be seen in FIG. 3A, the plurality of elongated members 34 and the connector 36 extend in a direction perpendicular to a major face of the opposing surfaces 32*a*, 32*b* (the major face being parallel to the surface of opposing faces 32*a*, 32*b*). The connector 36 is couplable to a vibrating means (not shown in FIG. 3A) so as to provide a vibrating action to the tool 30 as the refractory material is being densified. The elongated members 34 and the connector 36 may have a cross-section that is circular, oval, rectangular, or square in shape. Other shapes may be employed depending on the requirements of the specific application.

In the embodiment illustrated in FIGS. 3A-3C, an end 34' of each elongated member 34 that is proximal to the support 32 extends through the support 32. A first fastener 36*a*, such as a threaded nut, is threadedly coupled to a respective elongated member 34 and arranged adjacent to the surface 32*a*, and a second fastener 36*b* is threadedly coupled to the respective elongated member 34 and arranged adjacent to the surface 32*b*. Accordingly, the fasteners 36*a*, 36*b* are threadedly coupled to a respective one of the elongated members 34, and the support 32 is sandwiched between the fasteners 36*a*, 36*b*. By utilizing fasteners on each side of the support 32, the fasteners 36*a*, 36*b* effectively clamp the support 32 between the fasteners 36*a*, 36*b*, thereby enhancing the strength of the assembly formed by the support 32, the elongated members 34 and fasteners 36*a*, 36*b*.

In use, the gap 26 is filled with the material to be densified, the connector 36 of the tool 30 is attached to the vibration device, and the tool is placed in the material within the gap 26. The vibration device, which may be a mechanically-powered vibration device, a pneumatically-powered vibration device, an electrically powered vibration device, or the like, is activated and the tool is held in place for a predetermined amount of time to densify the material.

Filling the gap and applying vibration may be done sequentially. For example, a layer of material may be deposited in the gap, the layer having a prescribed thickness. Preferably, the thickness of each layer is less than a length of the elongated members. Upon achieving a desired layer thickness, the tool may be inserted into the material and vibration applied to the tool to densify the layer of material. Once the material has been densified, the process may be repeated where another layer is deposited over the already densified layer, and vibration is again applied. This can be repeated until a desired thickness of densified material has been obtained.

As an alternative to the sequential approach described above, filling the gap with material and applying vibration may be done simultaneously. For example, vibration can be applied to the tool after the initial layer is deposited in the gap, thereby densifying the initial layer. While vibration is being applied to the tool, additional material may be deposited in the gap to build the thickness of the layer of material. The simultaneous application of material and vibration is advantageous in that it can speed up the densification process.

Figure 4A:
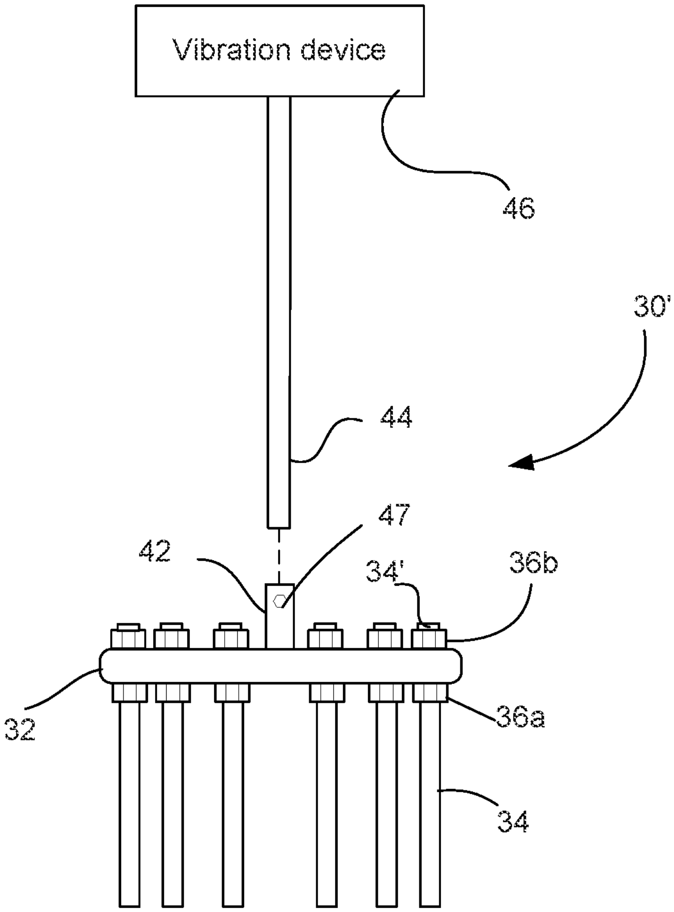
FIG. 4A is a side view of an exemplary tool in accordance with another embodiment of the invention.
Figure 4B:
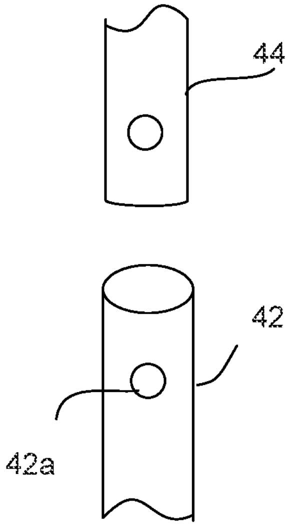
FIGS. 4B and 4C illustrate embodiments of a fastening means for securing the tool to a vibration means.
Figure 4C:
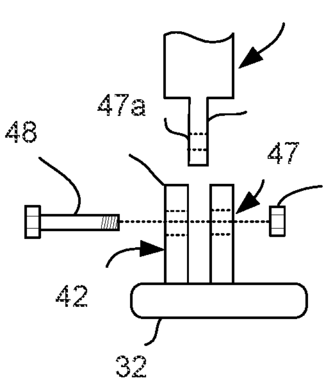

Moving to FIGS. 4A-4C, illustrated is another embodiment of a tool 30' in accordance with the invention. The tool 30' is similar to the tool 30 of FIGS. 3A-3C except for the connection to the vibration means. More specifically, the tool 30' includes a connector 42, such as a sleeve or other connection means, the connector 42 configured to receive an actuator 44 of a vibration mechanism 46. The connector 42 is dimensioned such that an inside dimension of the connector 42 corresponds to an outside dimension of the actuator 44 (or vice-versa). The dimensions may be such that an interference fit is created between the connector 42 and the actuator 44, or such that the actuator may slide into the connector 42.

FIGS. 4B and 4C illustrate exemplary fastening means for securing the tool to a vibration means. More particularly, FIG. 4B illustrates connector 42 in the form of a sleeve with a fastening means 42*a* in the form of a through hole, while FIG. 4C illustrates a connector 42 in the form of a joint with a fastening means 42*a* in the form of a through hole. The fastening means 42 is adapted to receive a threaded fastener, a locking pin, or the like, so as to secure the connector to the vibration means. For example, and as best seen in FIG. 4C, fastener 48 is insertable through the fastening means 42*a* and configured to secure the connector 42 to the actuator 44. Although FIG. 4B does not illustrate fastener 48, it will be appreciated that such fastener is also applicable to the embodiment of FIG. 4B.

In the illustrated embodiments of FIGS. 4A-4C the fastening means is shown as a through hole 47 and bolt 48 that passes through both the connector 42 and the actuator 44. However, other fasteners are may be used, e.g., a clamp or any other suitable fastener.

Figure 5:
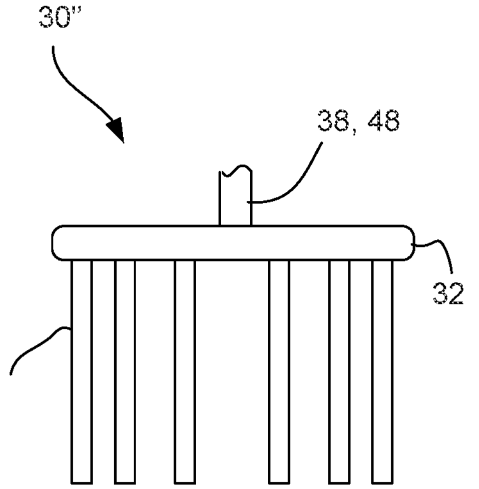
FIG. 5 is a side view of an exemplary tool in accordance with yet another embodiment of the invention.

Moving to FIG. 5, illustrated is another embodiment of the tool 30" according to the invention. In the embodiments of FIGS. 3 and 4 the elongated members 34 are each fastened to the support 32 via fasteners 36*a*, 36*b*. FIG. 5 illustrates an alternative means for fastening the elongated members 34 to the support 32. In the embodiment of FIG. 5, fasteners 36 are not used and instead the elongated members 34 are welded to the support 32 and/or threadedly coupled to the support 32. For example, the elongated members 34 may be inserted into a respective bore of the support 32, and the elongated members 34 then may be welded to the support 32. Alternatively or additionally, a threaded end of each elongated member 34 may be cooperate with a respective threaded bore in the support 32 to secure the elongated member to the support (i.e., a screw connection).

Figures 6A, 6B, 6C:
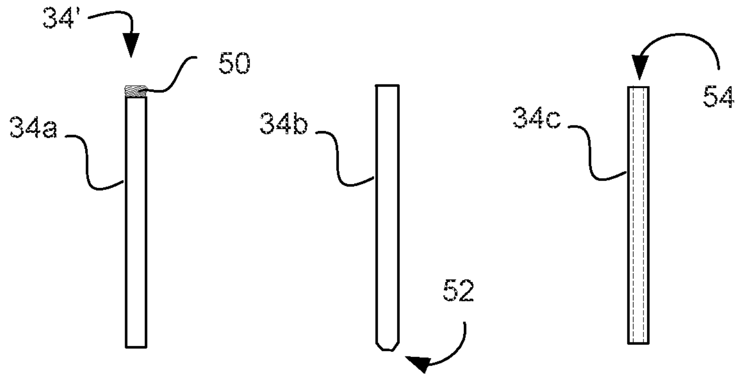
FIG. 6A is a side view of a threaded elongated member according to an embodiment of the invention that may be used with the tool of FIGS. 3-5.
FIG. 6B is a side view of a tapered elongated member according to another embodiment of the invention that may be used with the tool of FIGS. 3-5.
FIG. 6C is a side view of a hollow elongated member according to another embodiment of the invention that may be used with the tool of FIGS. 3-5.

Moving to FIGS. 6A-6C, illustrated are various embodiments of an elongated member 34 that may be used in any of the embodiments illustrated in FIGS. 3-5. FIG. 6A illustrates an elongated member 34*a* that includes threads 50 at the proximal end 34', the threads configured to cooperate with threads of a bore in the support 32 to enable each elongated member to be threadedly attached to the support 32. The elongated member 34*a* may be used with or without the fasteners 36*a*, 36*b*.

FIG. 6B illustrates an elongated member 34*b* in which an end 52 of the elongated member 34 distal from the surface 32*a* is tapered such that the diameter of the elongated member decreases toward the distal end 52. The tapered configuration enables the elongated member to be more easily inserted into the refractory material.

FIG. 6C illustrates yet another embodiment of the elongated member. Specifically, the elongated member 34*c* is a pipe or similar elongated element in which a center portion 54 is hollow to form a channel within the respective elongated member. As shown in FIG. 6C, the channel open at an end of the respective elongated member distal from the support 32.

It should be noted that the features of the elongated member shown in FIGS. 6A-6C can be combined, e.g., the elongated member can be threaded, have a tapered distal end, and/or be formed with a hollow inner portion.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method of densification of refractory material in a gap between a tap hole sleeve of a furnace and a surround block of the furnace, the surround block surrounding the tap hole sleeve, the method comprising:

positioning a tool in the gap, the tool including a support having opposing surfaces and a sidewall connecting the opposing surfaces, the opposing surfaces having an arcuate shape and defining an arc length, the opposing surfaces extending from a first end of the sidewall located at a first point along the arc length to a second end of the sidewall located at a second point along the arc length spaced from the first end, a plurality of elongated members extending from one of the opposing surfaces, and a connector arranged on the other of the opposing surfaces;

filing the gap with dry material; and applying vibration to the connector to densify the dry material.

2. The method according to claim 1, wherein filling the gap with dry material includes using at least one of magnesia, dolomitic magnesia or dolomitic material as the dry material.

3. The method according to claim 1, wherein applying vibration includes attaching a vibration machine to the connector, wherein the vibration machine applies a vibrating motion to the tool.

4. The method according to claim 1, wherein positioning the tool includes maneuvering the tool through a sump panel sanding hole of the furnace.

5. The method according to claim 1, wherein applying vibration includes using at least one of a mechanically-powered vibration device, a pneumatically-powered vibration device or an electrically-powered vibration device to apply the vibration to the tool.

6. The method according to claim 1, wherein filing the gap with dry material includes filing the gap in layers having a prescribed thickness.

7. The method according to claim 6, wherein the prescribed thickness is less than a length of elongated members.

8. The method according to claim 1, wherein the steps of filing the gap and applying vibration are performed simultaneously.

9. The method according to claim 1, wherein the steps of filing the gap and applying vibration are performed sequentially.

10. A tool for densification of refractory material in a tap-hole of a furnace, the tool configured to be positioned in a gap between a tap hole sleeve of a furnace and a surrounding block of the furnace, comprising: a support having opposing surfaces and a sidewall connecting the opposing surfaces, the opposing surfaces having an arcuate shape and defining an arc length, the opposing surfaces extending from a first end of the sidewall located at a first point along the arc length to a second end of the sidewall located at a second point along the arc length spaced from the first end, a plurality of elongated members extending from one of the opposing surfaces; and a connector arranged on the other of the opposing surfaces, the connector comprising a fastener configured to selectively and fixedly couple the connector to a vibrating member.

11. The tool according to claim 10, wherein at least some of the plurality of elongated members include a channel formed within the respective elongated member, the channel opening at an end of the respective elongated member distal from the support.

12. The tool according to claim 11, wherein at least some of the plurality of elongated members comprise a pipe.

13. The tool according to claim 10, wherein the arcuate shape is dimensioned to correspond to the tap hole of the furnace.

14. The tool according to claim 10, wherein the plurality of elongated members extend in a direction perpendicular to a major face of the opposing surfaces.

15. The tool according to claim 10, wherein the support comprises a metal plate.

16. The tool according to claim 10, wherein an end of at least some of the plurality of elongated members that is distal from the support is tapered.

17. The tool according to claim 10, wherein at least some of the plurality of elongated members are welded to the support.

18. The tool according to claim 10, wherein at least some of the plurality of elongated members are threadedly attached to the support.

19. The tool according to claim 10, wherein an end of at least some of the plurality of elongated members extends through the support, a first fastener is threadedly coupled to the respective elongated member and arranged on one of the opposing surfaces, and a second fastener is threadedly coupled to the respective elongated member and arranged on the other of the opposing surfaces.

20. The tool according to claim 10, wherein an outer radius of the opposing surfaces is between 14-16 inches, and an inner radius of the opposing surfaces is between 10-12 inches.

21. The tool according to claim 10, wherein the connector comprises a sleeve configured to receive to a vibrating member.

22. The tool according to claim 21, wherein the fastener comprises one of a clamp or a bolt.

23. The tool according to claim 10, further comprising a vibration device coupled to the connector.

24. The tool according to claim 10, wherein the opposing surfaces are planar surfaces that are substantially parallel to each other.

25. The tool according to claim 10, wherein the support has a length defined along a major axis of the support, and a width defined along a minor axis of the support, and a height defined between the opposing surfaces, the length being greater than the width, and the width being greater than the height.

26. The tool according to claim 10, wherein the fastener comprises a through hole formed in a portion of the connector.

27. The tool according to claim 26, wherein the fastener further comprises one of a threaded bolt configured for insertion into the through hole and a nut threadedly engagable with the bolt, or a pin configured for insertion into the through hole and a clip attachable to the pin.

* * * * *